US008711144B2

(12) United States Patent
Johnson et al.

(10) Patent No.: US 8,711,144 B2
(45) Date of Patent: Apr. 29, 2014

(54) PERCEPTION-BASED ARTIFACT QUANTIFICATION FOR VOLUME RENDERING

(75) Inventors: Jeffrey P. Johnson, Lawrenceville, NJ (US); John Patrick Collins, Cleveland Heights, OH (US); Mariappan S. Nadar, Plainsboro, NJ (US); John S. Nafziger, Morrisville, PA (US); Thomas Stingl, Erlangen (DE); Daphne Yu, Yardley, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 912 days.

(21) Appl. No.: 11/881,944

(22) Filed: Jul. 30, 2007

(65) Prior Publication Data

US 2008/0129732 A1 Jun. 5, 2008

Related U.S. Application Data

(60) Provisional application No. 60/834,693, filed on Aug. 1, 2006.

(51) Int. Cl.
*G06T 17/00* (2006.01)

(52) U.S. Cl.
USPC .......................................... 345/424; 345/419

(58) Field of Classification Search
USPC ........... 345/419, 424, 428, 617; 382/254, 275
See application file for complete search history.

(56) References Cited

U.S. PATENT DOCUMENTS

| 5,200,840 | A | * | 4/1993 | Koike et al. | 358/451 |
|---|---|---|---|---|---|
| 5,499,323 | A | * | 3/1996 | Doi et al. | 345/426 |
| 5,835,618 | A | * | 11/1998 | Fang et al. | 382/132 |
| 5,974,159 | A | * | 10/1999 | Lubin et al. | 382/106 |
| 6,137,904 | A | * | 10/2000 | Lubin et al. | 382/162 |
| 6,360,022 | B1 | * | 3/2002 | Lubin et al. | 382/260 |
| 6,614,447 | B1 | * | 9/2003 | Bhatia et al. | 345/592 |
| 6,654,504 | B2 | * | 11/2003 | Lubin et al. | 382/254 |
| 6,816,167 | B1 | * | 11/2004 | Rauchfuss et al. | 345/582 |
| 6,822,675 | B2 | * | 11/2004 | Jung et al. | 348/180 |
| 6,868,190 | B1 | * | 3/2005 | Morton | 382/278 |
| 7,010,159 | B2 | * | 3/2006 | Ali | 382/155 |
| 7,038,710 | B2 | * | 5/2006 | Caviedes | 348/180 |
| 7,170,933 | B2 | * | 1/2007 | Kouloheris et al. | 375/240 |
| 2002/0031277 | A1 | * | 3/2002 | Lubin et al. | 382/254 |
| 2003/0011679 | A1 | * | 1/2003 | Jung et al. | 348/181 |
| 2003/0012426 | A1 | * | 1/2003 | Ali | 382/155 |
| 2003/0026495 | A1 | * | 2/2003 | Gondek et al. | 382/261 |
| 2004/0012675 | A1 | * | 1/2004 | Caviedes | 348/180 |
| 2004/0081363 | A1 | * | 4/2004 | Gindele et al. | 382/260 |
| 2004/0259065 | A1 | * | 12/2004 | Geiger | 434/272 |

(Continued)

OTHER PUBLICATIONS

Gralla J, Guzman R, Brekenfeld C, Remonda L, Kiefer C., "High-resolution three-dimensional T2-weighted sequence for neuronavigation: a new setup and clinical trial", J Neurosurg, Apr. 2005, vol. 102, pp. 658-663.*

(Continued)

*Primary Examiner* — Ulka Chauhan
*Assistant Examiner* — Robert Bader
(74) *Attorney, Agent, or Firm* — Donald B. Paschburg

(57) ABSTRACT

Artifact quantification is provided in volume rendering. Since the visual conspicuity of rendering artifacts strongly influences subjective assessments of image quality, quantitative metrics that accurately correlate with human visual perception may provide consistent values over a range of imaging conditions.

17 Claims, 2 Drawing Sheets

(56) References Cited

U.S. PATENT DOCUMENTS

| | | | |
|---|---|---|---|
| 2005/0134582 A1* | 6/2005 | Hermann Claus et al. | 345/419 |
| 2005/0135555 A1* | 6/2005 | Claus et al. | 378/19 |
| 2005/0147320 A1* | 7/2005 | Hsieh et al. | 382/275 |
| 2006/0072799 A1* | 4/2006 | McLain | 382/128 |
| 2006/0215893 A1* | 9/2006 | Johnson | 382/128 |

OTHER PUBLICATIONS

Ginesu et al., "A multi-factors approach for image quality assessment based on a human visual system model", Department of Electrical and Electronic Engineering, University of Cagliari, Piazza D'Armi, Cagliari 09123, Italy, Received May 3, 2005; revised Nov. 9, 2005; accepted Nov. 24, 2005, available online Dec. 19, 2005.*

Groth et al., "Cathode Ray Tube Quality Control and Acceptance Testing Program: Initial Results for Clinical PACS Displays", May 2001, RadioGraphics, vol. 21, pp. 719-732.*

Leven, et al., "Interactive visualization of unstructured grids using hierarchical 3D textures", Proceedings of the 2002 IEEE Symposium on Volume Visualization and Graphics, Oct. 28-29, 2002, IEEE Press, Piscataway, NJ, pp. 37-44.*

Segall et al., "Pre-processing of compressed digital video", Proceedings of the 2001 SPIE conference on visual communications and image processing, San Jose, CA, Jan. 21-26, 2001, pp. 1-12.*

Wessling J, Fischbach R, Meier N, "CT colonography: protocol optimization with multidetector row CT-study in an anthropomorphic colon phantom", Radiology, Sep. 2003, vol. 228, pp. 753-759.*

Yuan X., Nguyen M. X., Chen B., Porter D. H., "High dynamic range volume visualization", Proceedings of IEEE Visualization, Oct. 2005, pp. 327-334.*

Zhou, H., Chen, M., and Webster, M. F., "Comparative evaluation of visualization and experimental results using image comparison metrics", Proceedings of the Conference on Visualization '02, Oct. 27-Nov. 1, 2002, IEEE Computer Society, Washington, DC, pp. 315-322.*

Scott Daly, "Visible Differences Predictor", Chapter 14 in Digital Images and Human Vision, 1993, MIT Press, pp. 181-206.*

Lubin et al., "Vision Model Based Assessment of Distortion Magnitudes in Digital Video", David Sarnoff Research Center, Paper presented at IAB Made to Measure Technical Seminar, [Online] 1996, XP002395516, Montreux, Switzerland, retrieved from URL: http://www.mpeg.org/MPEG/JND/.*

Luccichenti G, Cademartiri F, Pezzella FR, et al., "3D reconstruction techniques made easy: knowhow and pictures", European Radiology, Apr. 5, 2005, vol. 15, pp. 2146-2156.*

Mel, Bartlett W., "SEEMORE: combining color, shape, and texture histogramming in a neurally inspired approach to visual object recognition", Journal Neural Computation, vol. 9, Issue 4, May 15, 1997, pp. 777-804.*

Pizer SM, ter Haar Romeny BM, "Fundamental Properties of Medical Image Perception", Journal of Digital Imaging, Feb. 1991, vol. 4, No. 1, pp. 1-20.*

R. Robbins and R. Owens, "2D feature detection via local energy", Image and Vision Computing, vol. 15, May 1997, pp. 353-368.*

Higuera, F Vega-, Hastreiter, P, Naraghi, R, Fahlbusch, R, Greiner, G, "Smooth volume rendering of labeled medical data on consumer graphics hardware", Proceedings of SPIE, vol. SPIE—5744, pp. 13-21, 2005.*

Vega-Higuera, F.; Hastreiter, P.; Fahlbusch, R.; Greiner, G.; "High performance volume splatting for visualization of neurovascular data," IEEE Visualization, 2005, VIS 05, pp. 271-278, Oct. 23-28, 2005.*

Vos F, Serlie I, Van Gelder R, Stoker J, Vrooman H, Post F., "A review of technical advances in virtual colonoscopy", Medinfo 2001; vol. 10, pp. 938-942.*

E.M. Yeh, A.C. Kokaram, and N.G. Kingsbury, "A perceptual distortion measure for edge-like artifacts in image sequences", Human Vision and Electronic Imaging III, Proceedings of SPIE vol. 3299, Jan. 1998, pp. 160-172.*

Ahmed, M.N.; Yamany, S.M.; Mohamed, N.; Farag, A.A.; Moriarty, T., "A modified fuzzy c-means algorithm for bias field estimation and segmentation of MRI data," IEEE Transactions on Medical Imaging, vol. 21, No. 3, pp. 193-199, Mar. 2002.*

Ghosh, A.; Trentacoste, M.; Heidrich, W.; , "Volume rendering for high dynamic range displays," Fourth International Workshop on Volume Graphics, 2005., vol., No., pp. 91-231, Jun. 20-21, 2005.*

Ji, T.-L.; Sundareshan, M.K.; Roehrig, H., "Adaptive image contrast enhancement based on human visual properties," IEEE Transactions on Medical Imaging, vol. 13, No. 4, pp. 573-586, Dec. 1994.*

Jones RW, Witte RJ, "Signal intensity artifacts in clinical MR imaging", RadioGraphics 2000; vol. 20, No. 3, May 2000, pp. 893-901.*

Patric Ljung, Claes Lundstrom, Anders Ynnerman, and Ken Museth, Oct. 11-12, 2004, "Transfer Function Based Adaptive Decompression for Volume Rendering of Large Medical Data Sets", Proceedings of the 2004 IEEE Symposium on Volume Visualization and Graphics (VV '04), IEEE Computer Society, Washington, DC, pp. 25-32.*

A. McNamara, "Visual perception in realistic image synthesis," Eurographics 2000: State of the Art Report (STAR), Interlaken, Switzerland, 2000. 1, 2.*

Meißner M, Guthe S, Strasser W, Apr. 2001, "Higher quality volume rendering on PC graphics hardware", Wilhelm Schickard Institute for Computer Science, Graphical-Interactive Systems (WSI/GRIS), University of Tuebingen, 10 pages.*

Peh WC, Chan JH, "Artifacts in musculoskeletal magnetic resonance imaging: identification and correction", Skeletal Radiology 2001, vol. 30, No. 4, Apr. 2001, pp. 179-191.*

Ray, H.; Pfister, H.; Silver, D.; Cook, T.A.; , "Ray casting architectures for volume visualization," IEEE Transactions on Visualization and Computer Graphics, vol. 5, No. 3, pp. 210-223, Jul.-Sep. 1999.*

Siddiqui KM, Siegel EL, Reiner BI, Johnson JP, Apr. 15, 2005, "Correlation of radiologists' image quality perception with quantitative assessment parameters: just-noticeable difference vs. peak signal-to-noise ratios", Proceedings SPIE 2005; vol. 5748: pp. 58-64.*

Peter L. Williams and Samuel P. Uselton, "Metrics and generation specifications for comparing volume-rendered images", The Journal of Visualization and Computer Animation, vol. 10, Issue 3, pp. 159-178, Jul./Sep. 1999.*

Mark R. Bolin and Gary W. Meyer. 1998. A perceptually based adaptive sampling algorithm. In Proceedings of the 25th annual conference on Computer graphics and interactive techniques (SIGGRAPH '98). ACM, New York, NY, USA, 299-309.*

Brian W. Keelan and Hitoshi Urabe, "ISO 20462, A psychophysical image quality measurement standard," in Image Quality and System Performance, edited by Yoichi Miyake and D. René Rasmussen, Proceedings of SPIE—IS&T Electronic Imaging, vol. 5294, (2004), pp. 181-189.*

Stephen M. Pizer; Bart M. ter haar Romeny, "Fundamental Properties of Medical Image Perception", Journal of Digital Imaging, vol. 1, No. 1, Feb. 1991, pp. 1-20.*

Mark R. Bolin, Gary W. Meyer, "A Perceptually Based Adaptive Sampling Algorithm", Jul. 24, 1998, ACM, Proceedings of the $25^{th}$ annual conference on Computer graphics and interactive techniques, pp. 299-309.*

J. Lubin and D. Fibush, "Sarnoff JND Vision Model," Jul. 2, 1997, T1A1.5 Working Group Document #97-612, ANSI T1 Standards Committee.*

\* cited by examiner

US 8,711,144 B2

PERCEPTION-BASED ARTIFACT QUANTIFICATION FOR VOLUME RENDERING

RELATED APPLICATIONS

The present patent document claims the benefit of the filing date under 35 U.S.C. §119(e) of Provisional U.S. Patent Application Ser. No. 60/834,693, filed Aug. 1, 2007, which is hereby incorporated by reference

BACKGROUND

The present embodiments relate to volume rendering. In particular, medical data is volume rendered.

Volume rendering is a general method to composite 3D digital volumetric data onto a 2D image. The quality and appearance of the resulting image can vary widely from one volume rendering engine to another due to the choice of different tradeoffs in different implementations. Even within one volume rendering engine, different image quality and appearance can be produced depending on the choice of parameters. Other than gross errors, there is often no right or wrong resulting image, only whether the resulting image is "better" or "worse" in revealing the desired features for a particular task or in minimizing the appearance of undesirable rendering artifacts.

The choice of rendering engine and parameters is often left up to the subjective heuristics of the software developers, who attempt to select parameters that would yield good quality given rendering speed performance considerations. A volume rendering engine is capable of producing a range of image qualities that are inversely related to the rendering speed. Faster rendering methods often rely on simpler algorithms and approximations that can introduce visible distortions or structural artifacts that degrade image quality.

Common volume rendering artifacts include shading edge noise, edge non-smoothness, striations, and opacity inconsistency. Shading noise is dark and light grains and often occurs in regions of the data where a surface is ill defined. Small noise levels in the data are exaggerated in the shading computation. Shading noise artifacts are common among volume rendering engines that use gradient-based shading methods without special surface treatments. Edge non-smoothness often occurs when a slice-based volume is clipped by a binary mask in an orientation that is not orthogonal to the volume axes. Striation artifacts may result from various sources such as under-sampling, the choice of filtering kernel, quantization, or classification schemes. Opacity inconsistency occurs when a volume renderer fails to account fully for the size variations in anisotropic volume data, resulting in variations in visible image color and/or luminance as the volume is rotated.

The tradeoffs between quality and rendering speed are evaluated through subjective visual assessments by rendering engine developers. Conventional distortion metrics, such as mean squared error, have limited utility because they often fail over a range of image and artifact characteristics. Mean squared error does not provide a meaningful quantitative reference since its value highly depends on the content of the image.

BRIEF SUMMARY

By way of introduction, the preferred embodiments described below include methods, systems, instructions, and computer readable media for artifact quantification in volume rendering. Since the visual conspicuity of rendering artifacts strongly influences subjective assessments of image quality, quantitative metrics that accurately correlate with human visual perception may provide consistent values over a range of imaging conditions.

In a first aspect, a system is provided for artifact quantification in volume rendering. A memory is operable to store a dataset representing a three-dimensional volume. A processor is operable to volume render a two-dimensional representation of the volume from the dataset and is operable to determine a quantity representing an artifact as a function of a perception-based visual quality metric. A display is operable to display the two-dimensional representation of the volume, the quantity, or both.

In a second aspect, a method is provided for artifact quantification in volume rendering. A volume rendered image is volume rendered from a dataset. A processor quantifies visibility to a user of an undesirable rendering feature in the volume rendered image.

In a third aspect, a computer readable storage medium has stored therein data representing instructions executable by a programmed processor for artifact quantification in volume rendering. The storage medium includes instructions for volume rendering an image representation of a volume from a data set representing the volume, calculating a first quantity with a human visual model from the image representation, and identifying a rendering artifact as a function of the first quantity.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

Figure 1:
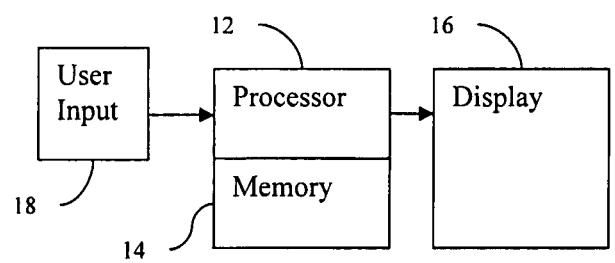
FIG. 1 is a block diagram of one embodiment of a system for artifact quantification in volume rendering.

The visibility of artifacts in volume rendered images is quantitatively evaluated. The subjective visual quality of volume rendered images is often influenced by the presence and severity of several common artifacts. Conventional image difference metrics, such as mean squared error, often fail to correlate consistently with perceived differences or quality. Visual image quality metrics (VIQM) quantitatively measure the visibility of volume rendering artifacts by simulating image perception by the human visual system. VIQM allows for evaluating and optimizing volume rendering methods and parameters to achieve desired tradeoffs between artifact visibility and rendering speed.

A visual image quality metric provides a quantitative quality measurement. The perception-based metric is computed from a visual discrimination or human perception model, which is based on responses of the primary physiological mechanisms in the human visual system. The output metric is a prediction of the visibility of image characteristics or of differences between images. This metric has been found to correlate well with human perception, whereas standard engineering metrics, such as mean-squared error, consider only the differences in digital image values at individual pixels without regard to factors in image display and perception that affect the visibility of those differences. Mean-squared error is a quantity computed from differences in image pixel values. The mean-squared error formula does not take into account any factors that influence the ability of human observers to detect those differences. Images of the same object may have the same mean-squared error even though very visually different. A process or a combined measurement of various modeled neural processes may be modeled for perception-based metrics. Perception-based metrics may include factors such as luminance sensitivity, contrast sensitivity, selective responses of spatial frequency, feature orientation, and/or psychophysical masking. The visibility of image features or differences between images may be measured quantitatively in standard psychophysical units of just-noticeable differences (JND). JND may be established through experimentation, set based on one users perception, or other technique. Other units of measurement may be used.

In the application for single-image features, JND can be measured between a uniform background image and the target image for comparison. For paired images, JND reflects the perceived image differences between the two images. Two-dimensional JND maps are generated for each spatial frequency and orientation channel and can be combined across channels to create composite JND maps and across pixel locations to generate scalar JND values. VIQM values are linearly correlated with subjective quality ratings and task performance, and may provide a more reliable, quantitative measurement of what a human observer will actually perceive in image.

VIQM is used to evaluate quantitatively the visibility of volume rendered image artifacts. The amount of shading edge noise is quantified by measuring the responses of higher spatial frequency visual channels to noise in single images. The visibility of non-smooth clip edges or other linear artifacts is quantified by measuring changes in the magnitude and angular distribution of responses in spatial frequency channels to edges, striations, and other linear structures. The amount of striation artifacts without extended linear segments is quantified by measuring the changes in the magnitude and frequency distribution of spatial frequency channel responses, such as for wood grain artifacts. The amount of view-dependent artifacts, such as opacity inconsistencies, is quantified by JND values across rendering pairs from different rendered views.

FIG. 1 shows a system for artifact quantification in volume rendering. The system includes a processor 12, a memory 14, a display 16, and a user input 18. Additional, different, or fewer components may be provided. For example, a network or network connection is provided, such as for networking with a medical imaging network or data archival system.

The system is part of a medical imaging system, such as a diagnostic or therapy ultrasound, x-ray, computed tomography, magnetic resonance, positron emission, or other system. Alternatively, the system is part of an archival and/or image processing system, such as associated with a medical records database workstation or networked imaging system. In other embodiments, the system is a personal computer, such as desktop or laptop, a workstation, a server, a network, or combinations thereof for rendering three-dimensional representations. For example, the system is part of a developer's computer system for designing or calibrating a rendering engine. As another example, the system is an end-user system for rendering images for diagnosis.

The user input 18 is a keyboard, trackball, mouse, joystick, touch screen, knobs, buttons, sliders, touch pad, combinations thereof, or other now known or later developed user input device. The user input 18 generates signals in response to user action, such as user pressing of a button.

The user input 18 operates in conjunction with a user interface for context based user input. Based on a display, the user selects with the user input 18 one or more controls, rendering parameters, values, quality metrics, an imaging quality, or other information. For example, the user positions an indicator within a range of available quality levels. In alternative embodiments, the processor 12 selects or otherwise controls without user input (automatically) or with user confirmation or some input (semi-automatically).

The memory 14 is a graphics processing memory, video random access memory, random access memory, system memory, cache memory, hard drive, optical media, magnetic media, flash drive, buffer, combinations thereof, or other now known or later developed memory device for storing data or video information. The memory 14 stores one or more datasets representing a three-dimensional volume for rendering.

Any type of data may be used for volume rendering, such as medical image data (e.g., ultrasound, x-ray, computed tomography, magnetic resonance, or positron emission). The rendering is from data distributed in an evenly spaced three-dimensional grid, but may be from data in other formats (e.g., rendering from scan data free of conversion to a Cartesian coordinate format or scan data including data both in a Cartesian coordinate format and acquisition format). The data is voxel data of different volume locations in a volume. The voxels are the same size and shape within the dataset. Voxels with different sizes, shapes, or numbers along one dimension as compared to another dimension may be included in a same dataset, such as is associated with anisotropic medical imaging data. The dataset includes an indication of the spatial positions represented by each voxel.

The dataset is provided in real-time with acquisition. For example, the dataset is generated by medical imaging of a patient. The memory 14 stores the data temporarily for processing. Alternatively, the dataset is stored from a previously performed scan. In other embodiments, the dataset is generated from memory, such as associated with rendering a virtual object or scene. For example, the dataset is an artificial or "phantom" dataset. The dataset is designed, selected, or generated to have desired characteristics, such as a representing a uniform sphere or specific amount of noise. Different types of artifacts may use different datasets to define the artifact region and calibrate the measured outcome.

The processor 12 is a central processing unit, control processor, application specific integrated circuit, general processor, field programmable gate array, analog circuit, digital circuit, graphics processing unit, graphics chip, graphics accelerator, accelerator card, combinations thereof, or other now known or later developed device for rendering. The processor 12 is a single device or multiple devices operating in serial, parallel, or separately. The processor 12 may be a main processor of a computer, such as a laptop or desktop computer, may be a processor for handling some tasks in a larger system, such as in an imaging system, or may be a processor designed specifically for rendering. In one embodiment, the processor 12 is, at least in part, a personal computer graphics accelerator card or components, such as manufactured by nVidia, ATI, or Matrox.

Different platforms may have the same or different processor 12 and associated hardware for volume rendering. Different platforms include different imaging systems, an imaging system and a computer or workstation, or other combinations of different devices. The same or different platforms may implement the same or different algorithms for rendering. For example, an imaging workstation or server implements a more complex rendering algorithm than a personal computer. The algorithm may be more complex by including additional or more computationally expensive rendering parameters.

The processor 12 is operable to volume render a two-dimensional representation of the volume from the dataset. The two-dimensional representation represents the volume from a given or selected viewing location. Volume rendering is used in a general sense of rendering a representation from data representing a volume. For example, the volume rendering is projection or surface rendering.

The rendering algorithm may be executed efficiently by a graphics processing unit. The processor 12 may be hardware devices for accelerating volume rendering processes, such as using application programming interfaces for three-dimensional texture mapping. Example APIs include OpenGL and DirectX, but other APIs may be used independent of or with the processor 12. The processor 12 is operable for volume rendering based on the API or an application controlling the API. The processor 12 is operable to texture map with alpha blending, minimum projection, maximum projection, surface rendering, or other volume rendering of the data. Other types of volume rendering, such as ray-casting, may be used.

The rendering algorithm renders as a function of rendering parameters. Some example rendering parameters include voxel word size, sampling rate (e.g., selecting samples as part of rendering), interpolation function, size of representation, pre/post classification, classification function, sampling variation (e.g., sampling rate being greater or lesser as a function of location), downsizing of volume (e.g., down sampling data prior to rendering), shading, opacity, minimum value selection, maximum value selection, thresholds, weighting of data or volumes, or any other now known or later developed parameter for rendering. The rendering parameters are associated with two or more options, such as a range of possible fractional or integer values. For example, pre/post classification (classification timing) may be a binary setting providing for mapping luminance to color before or after interpolation. The algorithm may operate with all or any sub-set of rendering parameters. The rendering parameters may be set for a given algorithm, such as a renderer operating only with pre-classification. Other rendering parameters may be selectable by the developer or end-user, such as selecting sampling rate and word size by a developer or selecting shading options by an end-user.

The image is rendered from color data. Alternatively, the image is rendered from grayscale information. The visibility of volume rendering artifacts may be best shown by color information, grayscale information, or both. Since grayscale values are directly related to the luminance output of an image display device, grayscale values may more likely provide visible artifacts. Pixel values for RGB(A) images can be transformed to grayscale values by applying standard conversions to hue-saturation-value (HSV) or NTSC luminance-chrominance (YUV) coordinates and setting the hue and saturation components to zero. Restricting the VIQM computation to the grayscale component of color images may simplify and expedite calculation without significant loss of accuracy for the volume rendering artifacts described herein.

The processor 12 is operable to determine a quantity representing an artifact. The two-dimensional representation of the volume alone or in combination with a reference image is used for the calculation. The quantity is a function of a perception-based visual quality metric. The metric correlates with human perceptual ratings, so is more reliable as a quantitative measurement of what would be perceived in an image by a human observer. Any visual model may be used. Example perception-based visual quality features contributing to the metric include vertical features, horizontal features, other orientation/angle features, contrast sensitivity, luminance sensitivity, and/or psychophysical masking.

The selection of features is adapted based on use cases and can be a combination of features. The same features may be used for different artifacts, but different features may be determined for different artifacts. The feature set is based on the visual discrimination model simulation.

To compute the features in one example embodiment, the input image is filtered by a set of biologically inspired spatial frequency and orientation tuned filters, defined mathematically as two-dimensional Gabor functions with various scales and orientations, breaking the image into 20 channels, at 5 different spatial frequencies (octave spacing from 0.5 cycles per degree to Nyquist/2) and 4 orientations (0, 45, 90, 135 degrees). The filtering is done by fast convolution, which transforms the image into the frequency domain using the Fast-Fourier transform (FFT) then point-by-point multiplication with the respective filter. Each channel is returned to the spatial domain by inverse FFT, with the complex values converted to real by taking the absolute value. Each channel is converted to local-contrast by dividing the pixel luminance by the local mean luminance. The local mean luminance is computed by fast convolution with a low-pass filter, whose passband is two octaves lower than the channel's peak band-pass frequency.

Figure 3:
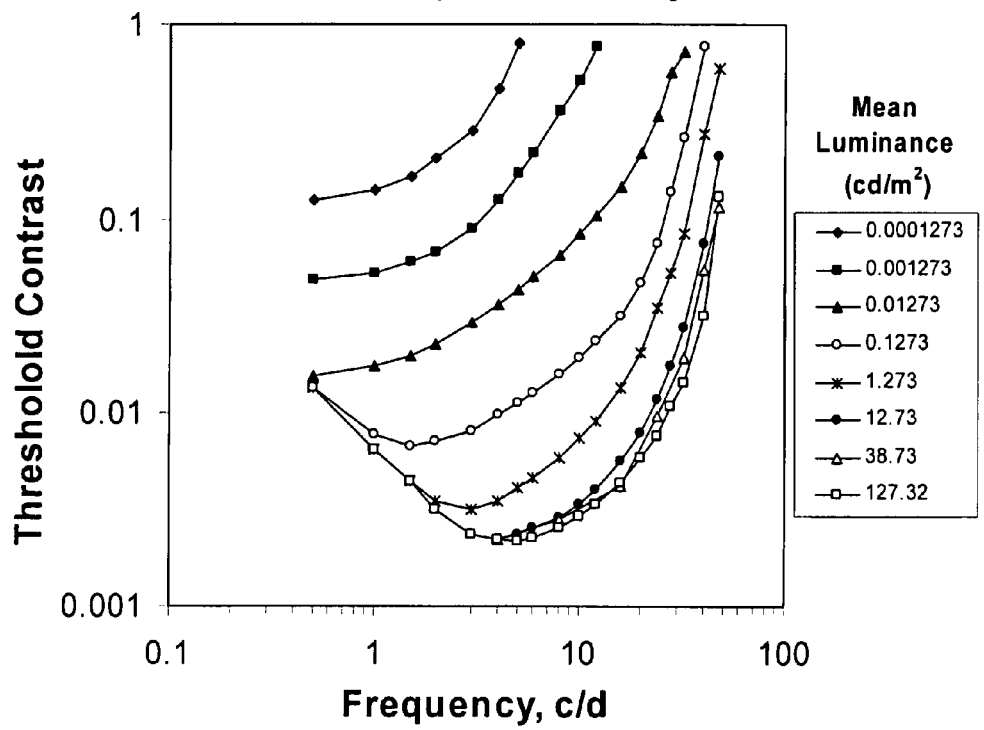
FIG. 3 shows one example of contrast sensitivity curves by luminance.

The spatial frequency channels are weighted by a psychophysically measured contrast sensitivity function, where sensitivity varies with spatial frequency and luminance. Any contrast sensitivity function may be used. The contrast sensitivity function is a frequency-dependent function to be applied in each channel to adjust the sensitivities to match experimental psychophysical data. In general, the contrast sensitivity function has a peak in sensitivity around 4 cycles per degree with monotonic decreases in sensitivity below and above the peak. The magnitude and shape of the curve depends on the light adaptation level of the eyes. The contrast sensitivity function depends on luminance and frequency. For example, the mean luminance of a given image is used to interpolate between curves, such as shown in FIG. 3. The contrast threshold shown is inversely related to sensitivity, so the curves have minima instead of peaks.

One set of 20 channels representing the responses of the visual system to luminance contrast is provided. Other numbers of channels, factors, groupings of features, divisions of spatial frequencies, and/or orientations may be used.

The metric is calculated from the features. Alternatively, data from each channel or combinations of channels may be used as a metric.

The data may be separated by spatial frequency, such as determining quality metric values for data of the dataset at higher and lower frequencies. The dataset is low pass and high pass filtered. The quality metrics are then determined from the two different filter outputs. Band pass or other spatial frequency isolation techniques may be used, such as to create three or more output datasets at three or more respective spatial frequencies.

The visual image quality metric is a two-dimensional map, linear map, or scalar measurement. For example, the metric is calculated for each pixel or groups of pixels for an image. Metric values as a function of two-dimensional distribution are provided and may be displayed as an image or contour map. In one embodiment, the metric values are provided as the two-dimensional channel or feature data, or combinations of multiple channels or features. The values of the quality metric may be combined or originally calculated along one or more lines for a linear map. For a scalar value, an average, mean, median, highest, lowest, or other function is used to calculate the metric from the map. Alternatively, the calculation outputs a scalar value. By applying psychophysically measured weighting functions, including contrast sensitivity and masking, the visual image quality metrics are defined in JND units.

The scalar value may be for an entire image or one or more regions of an image. For example, selecting a higher or lowest value identifies a region. As another example, a region of a pre-determined size, user selected region, or automatically determined region is used. The region is centered on or otherwise placed to cover desired values of the channel map, such as the highest value. The region is circular, square, rectangular, irregular, or other shape, such as following an edge feature. A threshold may be applied to identify a plurality of regions with sufficiently high or low values or to remove regions associated with very low or very high values. In one embodiment, the scalar value is determined by the combination of mapped quality values within the region or regions. In another example, segmentation or masking is performed to remove areas that are irrelevant to the user (e.g., regions outside the imaged body).

One quality metric is used. Alternatively, more than one quality metric may be calculated. A plurality of quality metrics may be combined as one value. Alternatively, each quality metric is calculated separately.

In one embodiment, the values for the channels are combined to from a map (e.g., two-dimensional distribution) or a scalar value (e.g., single value of the metric for the image) as the metric. For example, two-dimensional maps are generated for each visual channel and then combined across channels to create a composite map. Composite maps are generated by applying a maximum operation, Minkowski summation, or other combination function at each pixel location across the selected set of channels. Scalar metrics are then determined for the composite map by computing statistical measures, such as the mean and standard deviation of the quality metric values, or finding histogram values (e.g., the median or a high percentile (e.g., 90-99$^{th}$) value). As another example, scalar values are determined for each channel map. The scalar values may be combined. Data from the map and/or the scalar values may be used as the metric (e.g., VIQM).

The channels, functions, combination, spatial frequency, or other factor for perception-based visual quality metrics used for a given rendering, rendering algorithm, or rendering engine may be based on the application. For a particular defined end user task, the choice of the scalar measurements are fine tuned to artifacts that are most important to the task at hand. Individual frequency or orientation channels, composite maps, or other information that most reflect the salient artifacts are used for the application. The other channels are also used or not used.

For example, each of the 20 channels above is used to quantify different types of artifacts, but with different patterns or weighting used for different artifacts. Any artifact may be identified and quantified, such as shading noise, edge non-smoothness (e.g., striation), opacity inconsistency, or combinations thereof. The processor 12 identifies an artifact level or quantity for one or more of the artifact types.

In one embodiment, shading noise is quantified. A VIQM measurement of the amount of shading edge noise produced by a particular volume rendering engine is calculated. An image is rendered from artificial dataset or a real dataset with a known or specified amount of noise. By using a standardized phantom or dataset with a calibrated amount of noise, the measured responses of the higher spatial frequencies in the visual channels can be compared with each other. The choice of the added noise can be modeled after the typical noise in realistic data. Gaussian, stochastic, or other noise may be a simple noise that can be used as an indicative test. Stochastic noise in medical datasets is normally composed of spatial frequencies that are relatively high compared to the dominant frequencies found in anatomical structures.

One or more channels or perception-based visual quality metrics are determined from the rendered image. The perception-based visual quality metric used to identify shading noise is the higher spatial frequency responses of the two-dimensional representation. The higher or highest spatial frequency channel responses or features are calculated, and/or a difference between higher and lower spatial frequency channels is calculated. The visibility of noise can be measured by the JND levels in the higher spatial frequency channels, typically at 8 cycles per degree or higher. The 8 cycles per degree is a measure of visual arc. At different distances, a given pixel represents a different degree of arc. Further away provides for a smaller arc, providing higher visual spatial frequency.

Since shading edge noise varies between images and noise-free reference images are generally not available, measurements of noise visibility with VIQM are normally done using visual channels computed for a single image instead of paired images. The effects of rendering methods that seek to reduce shading edge noise, for example, can be assessed and optimized by evaluating the JNDs within high-frequency channels and in image regions where the shading edge noise is visible. The image regions are selected manually by the user or may be automatically detected, such as associated with the maximum values of the high spatial frequency channels. Lower JND levels in this case would indicate reduced noise visibility. Other channels or calculations may be used.

Since shading edge noise is generally anisotropic and exhibits no preferred orientation, VIQM computations can be simplified by first combining the orientation channels for a single frequency band. Any combination may be used, such as a maximum or Minkowski distance operation at each pixel before computing scalar JND values for the composite map or one or more regions. Alternatively, one orientation is used, and the data for others is not used.

In one embodiment, edge non-smoothness is quantified. A real phantom cube or artificial dataset is rendered in an obliquely clipped view. The edge non-smoothness is quantified by measuring the oriented responses of channels within the clipped region. The responses at a respective plurality of orientations relative to the two-dimensional representation are used as perception-based visual quality metrics. The responses of orientation channels in VIQM modeling are strongest when the channel orientation is aligned with linear structures or edges in an image. Consequently, the visibility of edges, striations, or other linear artifacts can be measured most sensitively by analyzing JND values in orientation channels that are most closely aligned with those structures. The magnitude of the oriented channel responses decreases as the corresponding image structures become less visible. For example, a reduction in edge sharpness due to a change in interpolation method may be measured by the decrease in responses of the orientation channels aligned with the edge, primarily in the higher spatial frequencies of 8 cycles per degree or higher. A loss of edge smoothness due to step artifacts decreases the response of channels aligned with the edge, again primarily in higher spatial frequency channels, but also increases the responses of channels aligned with the edges of the steps. For example, steps appearing along an edge tilted 45° from the horizontal direction increase the JND output of orientation channels that respond strongest to horizontal and vertical edges. Other channels or calculations may be used.

The changes in or difference between channel responses are measured using single-image calculations. For example, an absolute quantity or scalar identifies the level of artifact. In other embodiments, a paired-image calculation is performed. The difference in response between a reference image with relatively low artifact visibility and the rendered image is determined.

For wood grain and other structural artifacts that have curvilinear features without extended linear segments or constant orientation, the magnitude and distribution of channel responses across spatial frequency bands may be used to measure artifact visibility. Rendering methods or parameters that reduce the visibility of this type of artifact generally decrease the response of channels across all frequency bands, but to a greater extent in the mid to high frequency bands ($\geq 4$ cycles per degree), shifting the response distribution toward lower frequencies. The metric or metrics may be determined by magnitude and/or spatial distribution from the orientation channels at the mid and/or high frequency bands.

In another embodiment, opacity inconsistency is quantified. A plurality of measures of differences between the two-dimensional representation and another two-dimensional representation of the volume rendered from a different perspective are used as the perception-based visual quality metrics. Opacity inconsistency is a view-dependent artifact. Opacity inconsistency or other view dependent artifacts may result from inadequate correction of various voxel sizes. To detect and quantify this artifact, two or more images of an anisotropic volume of a spherical object are rendered at various viewing angles. Since the phantom object in this case is a sphere, there should not be image registration issues between these various views. The rendering is performed with a translucent transfer function for opacity inconsistency. JND values are measured between combinations of image pairs obtained from different rendering directions. The JND values are provided by determining the differences between channel data, such as differences for each channel or between combinations of all or some channels. The values represent differences between the renderings of the same object from different directions, indicating visual opacity inconsistency.

Other types of artifacts may be quantified. The nature of human perception is modeled to quantify the artifact. The contrast, orientation, spatial frequency, and/or other characteristic metric are used to quantify the artifact.

The quantity is determined from the channel data or comparison of channel data. For example, a pattern within or across channels is used for quantification. Any pattern may be used. For example, low frequency channels are ignored. As another example, all of the channels are used, with certain channels weighted higher, certain channels combined to provide one map or value, or certain channels relationship to other channels being used to identify the signature of a type of artifact.

The quantity may be a maximum value, average value or other value calculated from the just-noticeable differences or perception-based metric. For example, averages for regions associated with the highest one or more values are calculated from the two-dimensional map or image of one or more channels. As another example, the maximum value is identified for the entire image or separate sub regions.

In one embodiment, the quantity representing the level of artifact is a function of a histogram of the perception-based visual quality metric. The histogram is populated from single pixels or from different sub-regions of the channel or metric data. For sub regions, the metric data is a two-dimensional map created by filtering the rendered representation. The data is used to determine sub region scalar values or pixel values. The visibility (quantification) of rendering artifacts may be represented by scalar metrics derived from the histogram of JND values in the VIQM channel maps. Cases with extreme JND values (outliers) may distort the computed mean or region maximum value but have little effect on the median value. The median may be a more stable indicator of overall artifact visibility and correlate with subjective quality assessments. For applications in which an upper limit to the visibility of artifacts is to be specified, it is advantageous to compute a high-percentile JND value, typically greater than or equal to the $90^{th}$ percentile, from the histogram. The value associated with the higher percentile of the histogram distribution may ensure that there are no significantly large regions of an image for which the JND values are unacceptably high.

Visual quality metric values are computed using all of the pixels of the rendered image or image pair. Prior to determining or as part of quantifying an artifact, the dataset may be masked. Many medical images, including those produced by volume rendering, include regions of little or no diagnostic value. These regions may contain, for example, air spaces outside or inside the body. When these regions of an image are included in VIQM calculations, the data for the regions may distort the values of statistical and histogram-based scalar metrics and cause the quantity to depend on irrelevant image characteristics, such as the overall pixel dimensions or field of view.

A binary image mask that excludes irrelevant regions of the image may be applied to the dataset before rendering or to the visual channel maps before computing a scalar quantity. Data associated with regions other than the object of interest may be removed, such as by segmentation or otherwise masked. Where an artificial dataset is provided, the dataset may include zeros or other values representing masking, or there is no need for masking. In the case of measuring artifact visual responses on a designed phantom, the region of interest can be pre-defined to the region where the artifacts exist, such as along a clipped edge to avoid distortion in the result VIQM metrics. For artificially generated datasets with added noise or for datasets generated by scanning, data from regions outside an object of interest may be removed or set to another value for masking.

Any masking function may be used, such as manual designation. One masking function is low pass filtering the dataset and applying a threshold. Data below the threshold is set to zero or removed. In one embodiment, the dataset is masked as a function of at least the perception-based visual quality metric. One or more metrics are computed over sub regions of an image. For example, all twenty channels or just one channel (e.g., lowest frequency channel) are used. For multiple channels, the data for each spatial location is combined, such as averaging, maximum selection, or other combination. Background regions are excluded by eliminating locations at which the channel map values fall below a given threshold, such as below a value of 0.1 JND given a 0-1 range of values. JND values are normalized and are not image dependent. This thresholded sub region method generates useful scalar metrics in cases where the artifacts are highly localized and, consequently, the median and mean JND values would be grossly distorted by large numbers of insignificantly small values, if a JND threshold was not applied. The mask is applied to the dataset and another image rendered for quantification, and/or the mask is applied to the separate channels prior to determining a scalar quantity. Different or the same mask may be used for different channels.

The quantity representing the level of artifact may be used in any way, such as disclosed in U.S. Published Application No. 2008/0012856, the disclosure of which is incorporated herein by reference. The rendering is performed as a function of the perception-based visual quality metric in development, calibration, or real-time usage. For example, a user selects rendering parameters to be included, possible rendering parameter settings, groups of settings, or other setting of a rendering algorithm based on the metric. The parameters (e.g., type of rendering) and/or parameter values associated with noticeable differences or just noticeable differences based on the metric are used. At least one rendering parameter is altered as a function of the artifact quantity. For example, the sample size, sampling rate, classification, sampling variation, volume size, rendering method, or combinations thereof provide noticeable transitions in artifact level.

The quantitative feedback allows more optimal design to balance rendering speed or other performance with imaging results based on the perception of the user. Parameters or settings providing insufficient or no improvement in perception of artifacts may be avoided to minimize user confusion or frustration. Settings associated with lesser artifacts may be selected or determined.

As another example, different rendering algorithms and/or platforms are calibrated. The visual quality metric values are made the same or similar for a given situation, allowing more consistent use across the differences. Transitions between user selectable settings may be calibrated to provide noticeable differences in artifact level. The quality metric quantities allow developers to provide consistently rendering performance adjustments that relate to visible artifacts, rather than just rendering speed.

The perception-based visual quality metric is determined as a value for a given image, such as a volume rendered image. The difference between the values for different images may be compared. For example, a difference of values for the same perception-based visual quality metric between two different rendered images is calculated. The perceptual differences between different settings, algorithms, platforms, or other rendering factors are quantitatively represented by the difference. The difference may be calculated as a mathematical difference, a ratio, a percentage, or other function.

In one embodiment, the quality metric is calculated to indicate a difference from two or more images. The difference provides a visual image quality metric-based quantitative quality index. For example, one image is used as a frame of reference. The visual image quality metric relative to the frame or image of reference provides an index of the quality of a rendered image. The reference image may be at any quality level. For example, the scalar value or values between a particular rendered image and the reference image are calculated. In the case of a single volume rendering engine, the reference image may be the best image that this engine can produce with the highest resolution parameters. Each rendered image from various combinations of parameters is mapped to scalar quality values based on the magnitude of quality metric values between the current image and the reference image. The reference may be a lowest or other resolution image. The differences may be mapped to integer levels, negative values, and/or fractional levels.

Different metrics or quantities may be provided for each type of artifact. Alternatively, only one type of artifact is quantified. In another alternative, quantities for different types of artifacts are combined to provide an overall artifact level, such as by averaging.

The display 16 is a monitor, LCD, projector, plasma display, CRT, printer, or other now known or later developed devise for outputting visual information. The display 16 receives images, quality metric values, or other information from the processor 12. The received information is provided to the user by the display 16.

For example, the display 16 displays the two-dimensional representation of the volume. Where a setting of the rendering is selected as a function of the perception-based visual quality metric, the image may have an artifact less visually perceptible than for another setting. Two images rendered with different rendering settings have different levels of visual artifacts, avoiding iterative adjustments having little or no visual difference for the end user. As another example, the just noticeable differences, visual quality metric, or other quantification based on a visual model is displayed. The user may more objectively compare rendered images or determine a quality of a single rendered image for any purpose using the quantity.

The display 16 is part of a user interface. The user interface is for a developer or end-user. For a developer, the user interface may include one or more selectable quality metrics and output calculated values for a quality metric of a given image or between two images. The user interface for perception based quantification may be integrated with or separate from the volume rendering interface where the developer selects different rendering settings (e.g., parameters, values for parameters, and/or techniques). For an end user, the user interface may provide selectable levels of rendering where each level is associated with a perceptibly different visual artifact, limiting or avoiding unnecessary rendering adjustments.

The memory 14 and/or another memory stores instructions for operating the processor 12. The instructions are for artifact quantification in volume rendering. The instructions for implementing the processes, methods, and/or techniques discussed herein are provided on computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone, or in combination. Likewise, processing strategies may include multiprocessing, multitasking, parallel processing, and the like.

In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU or system.

The system of FIG. 1 or another system has various developmental, calibration, and/or end-user uses. In one embodiment, the perception-base visual quality metric is used as a methodology for the development of visual-quality-driven volume rendering. The volume rendering is developed for easier end-user use. For end-user use, the user input 18 receives an input of a selectable level of visual perception of an image artifact or rendering speed. The processor 12 maps the input to one or more settings of one or more rendering parameters. A level of artifact is responsive to the input of the selectable level. For developer use, different rendering parameter settings are selected. Groups of settings associated with different qualities of a visual aspect associated with a given application are selected. The map of settings to visual quality level is created, providing steps in artifact level associated with a visual aspect of the rendering artifact, rather than just resolution differences.

A visual image quality metric-based quantitative index of image quality is used or provided to the user. The index provides for task-specific visual quality driven volume rendering. Rather than making subjective heuristic decisions about quality by directly selecting different settings for rendering parameters, the rendering engine developer is empowered with a simple quantitative mapping between the level of perceived image artifacts and the corresponding set of rendering algorithm parameters. Volume rendering parameters are controlled based on meaningful levels of artifact as perceived by an end user.

For example, if N images are produced from a rendering engine by varying the rendering parameters and each image is compared to a high-quality reference image, the visual image quality metric can be computed for each of the N images in a manner based on the level of one or more artifacts. Settings associated with insufficient visual differences may be discarded. Each of the resulting visual image quality metric values are plotted and mapped to a single user interface parameter with N or a sub-set of possible values to control the level of image quality. The developer, in turn, maps the quality levels in this user interface to the sets of rendering parameters that produced the N or selected sub-set of images. The artifact level in combination with the visibility of desired features may be used.

From the end-user perspective, the quality levels correspond to observable artifacts and can be adjusted without any knowledge about the underlying rendering algorithms. From a software component development point-of-view, this independence from algorithm-specific parameters may be used to derive a standardized quality parameter control interface. The same control of quality levels may be provided in different rendering algorithms, platforms, or engines. The user control may be easily exchangeable between platform-specific volume rendering components.

In another embodiment, the perception-base visual quality metric is used as a calibration tool for quality uniformity across volume rendering engines (e.g., algorithms, hardware, and/or both). The processor 12 assists calibration of different rendering images as a function of the perception-based visual quality metric. In practice, volume rendering engines are often deployed in various software and graphics hardware-based implementations. In some cases, the same software application is deployed with different volume rendering engines depending on the available platform. In these cases, the consistency of visual image quality across platforms is important. Measuring the uniformity of visual quality, however, is complicated by the fact that each volume rendering engine on each platform is controlled by different algorithm-specific rendering parameters and there may be no common reference image.

For example, test images are evaluated in all possible pairings (round-robin pairing) of rendered images produced by different rendering engines but with nominally the same quality settings. The resulting visual image quality metrics measure the degree of dissimilarity across the various engines and may be used to define a threshold or upper limit for an acceptable level of dissimilarity. If the level of measured quality metric value is above a desired threshold, the rendering parameters of one or both of the rendering engines are adjusted with the goal of achieving a better match in visual equivalency. This calibration process is repeated between each pair of volume rendering engines so that the visually noticeable differences for corresponding quality levels are below an acceptable threshold of difference. Absolute values or difference quantities may be used.

In another embodiment, the perception-base visual quality metric is used as a calibration tool for controlling visual transitions between quality levels. The calibration is for different quality levels using a same rendering engine. Volume rendering engines may produce images using several predetermined quality settings or levels that affect the tradeoff between visual quality and rendering speed. From the end-user perspective, it is desirable for the increments between quality levels to be visually equal or similar to make the transition from low to high quality as smooth as possible. The visual magnitude of each quality step is determined by computing visual image quality metric values for each pair of consecutive images in a sorted sequence of quality levels.

The processor 12 renders with settings or groups of settings corresponding to at least a threshold difference in the value of a perception-based visual quality metric. For example, a sequence of images for the respective quality levels is rendered. The quality difference between images as a function of the perception-based visual quality metric is determined. The difference is between adjacent pairs of images in one embodiment. For each consecutive pair, one of the images is a reference image. Since consecutive pairs of reference and test images overlap in this scheme, a "sliding reference" image is used. The magnitude of each visual increment is measured and the variation plotted as a function of quality level. Rendering parameters may be adjusted to control the visual increments between quality levels and achieve the desired uniformity. If any visual increments fall below a developer-selected threshold, the design of the volume rendering engine may be simplified by retaining only the fastest renderer in each group of visually equivalent or similar quality settings.

In another embodiment, the perception-base visual quality metric is used as a tool for making quality versus speed performance decisions. The options available in a rendering algorithm or platform may be selected in a structured and objective way. The memory 14 stores groups of settings. Each group includes settings for a plurality of rendering parameters. Different rendering parameters may be provided as settings in different groups. Each group is associated with different quality levels. The quality levels are determined as a function of the perception-based visual quality metric. The settings within each group are further determined as a function rendering speed. For a given quality level, the settings with the greatest rendering speed are selected.

The visual image quality metric is used for evaluating quality and speed performance tradeoffs. For example, in certain volume rendering conditions, such as when the composited view is rendered from a very thick volume, the volume data is composited in such a way that little difference is perceived between rendering using a slower but theoretically more accurate method and rendering using a faster but theoretically less accurate method. The conditions under which this difference is "small enough" such that using the faster method is justifiable can be established using the perception-based metrics. When the difference in values of the perception-based visual quality metric between images rendered using the faster and slower method is below a certain threshold, the faster method is to be used. The rendering software or hardware is configured to provide the faster settings for the desired quality level. The options available to a user may be limited or conveniently provided based on the rendering speed and the visual aspect.

In another embodiment, the perception-base visual quality metric is used as a runtime tool for dynamic adjustment of rendering parameters based on actual data and system conditions. The processor 12 determines a value for the perception-based visual quality metric for each of multiple images rendered with different settings. The processor 12 selects settings as a function of the quality metric value and a rendering performance difference between the different settings. Differences in datasets, such as size or spacing, and/or differences in availability of rendering resources at a given time may result in different rendering speed or other performance. By determining the quality metric based on current datasets and conditions for two or more groups of settings, one or more groups of settings may be selected as optimal for current conditions. The current conditions are determined during runtime or are compared to previously determined ranges. For previously determined ranges, a look-up table or thresholds are used to identify settings appropriate for the current conditions.

This method of generating a quality verses performance tradeoff decision criterion may also be applied during development time. As an example for use during runtime, the composited view is rendered from a dataset above a certain thickness. The perceived difference between using different interpolation methods is very low for greater thicknesses. The rendering algorithm applies a rule that when the thickness is above a threshold, then the faster rendering method is to be used. The perception-base visual quality metric provides the developer or user an objective and systematic tool to establish the quality and performance tradeoff criterion with predictable quality consistency.

Other applications for development or rendering operation may be used.

Figure 2:
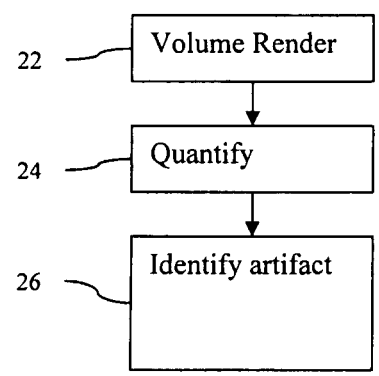
FIG. 2 is a flow chart diagram of one embodiment of a method for artifact quantification in volume rendering.

FIG. 2 shows a method for artifact quantification in volume rendering. The method is implemented by the system of FIG. 1 or another system. The acts of the method are performed in the order shown or other orders. Additional, different, or fewer acts may be provided. For example, act 26 is optional.

A dataset for rendering is received with viewing parameters. The dataset is received from a memory, a scanner, or a transfer. The dataset is isotropic or anisotropic. The dataset has voxels spaced along three major axes or other format. The voxels have any shape and size, such as being smaller along one dimension as compared to another dimension.

The viewing parameters determine a view location. The view location is a direction relative to the volume from which a virtual viewer views the volume. The view location defines a view direction and/or distance from the volume. The view location may be within the volume. The viewing parameters may also include scale, zoom, shading, lighting, and/or other rendering parameters. User input or an algorithm defines the desired viewer location.

Settings for rendering are also received. The settings are values for rendering parameters, selections of rendering parameters, selections of type of rendering, or other settings. The settings are received as user input, such as a developer inputting different settings for designing a rendering engine. Alternatively or additionally, the settings are generated by a processor, such as a processor systematically changing settings to determine performance and/or perception-based visual quality metric values associated with different settings. The settings may be predetermined, such as provided in a look-up table. One, more or all the settings may not be programmable.

In act 22, an image representation of a volume is volume rendered from the dataset representing the volume. Volume rendering is performed with the dataset based on spatial locations within the sub-volume. The rendering application is an API, other application operating with an API, or other application for rendering.

Any now known or later developed volume rendering may be used. For example, projection or surface rendering is used. In projection rendering, alpha blending, average, minimum, maximum, or other functions may provide data for the rendered image along each of a plurality of ray lines or projections through the volume. Different parameters may be used for rendering. For example, the view direction determines the perspective relative to the volume for rendering. Diverging or parallel ray lines may be used for projection. The transfer function for converting luminance or other data into display values may vary depending on the type or desired qualities of the rendering. Sampling rate, sampling variation, irregular volume of interest, and/or clipping may determine data to be used for rendering. Segmentation may determine another portion of the volume to be or not to be rendered. Opacity settings may determine the relative contribution of data. Other rendering parameters, such as shading or light sourcing, may alter relative contribution of one datum to other data. The rendering uses the data representing a three-dimensional volume to generate a two-dimensional representation of the volume.

The dataset for volume rendering is from any medical modality, such as computed tomography, magnetic resonance, or ultrasound. The dataset is from an actual scan. Alternatively, part or all of the dataset is artificial or modified. For example, a spherical phantom is volume rendered at a first viewing direction, and then volume rendered at a second, different viewing direction.

In act 24, a processor predicts visibility to a user of one or more types of artifacts. Visibility to a user of an undesirable rendering feature is quantified. One or more quantities of a visual perception metric are calculated from the image representation. Just noticeable difference levels of visibility of the undesirable rendering feature are calculated. The scale may provide larger transitions between artifact levels than "just noticeable." Other units may be used. A human visual model is used to quantify from the image representation. Any step size may be used to represent transitions between levels of visibility of artifacts.

The perception-based visual quality metric is calculated from a feature set of vertical features, horizontal features, other oriented features, contrast sensitivity, luminance sensitivity, psychophysical masking, or combinations thereof. More than one quality metric may be calculated from the feature set. For example, values for a plurality of perception-based visual quality metrics are calculated, and the values are combined. Values for the metric or metrics may be calculated for one or more spatial frequency bands of the data. The values are for point locations, regions, or the entire image. The quantity is, alternatively, a value from one of the features without further calculation.

The quality metric value or values are for a single rendered representation. Alternatively, the quality metrics represent a difference between a plurality of rendered representations.

In one embodiment, the quantity is determined by correlating responses from a plurality of perception-based visual quality metrics to rendering artifacts. For example, a greater response for higher spatial frequency of two or more of the metrics than lower spatial frequency is identified. The amount of difference or correlation characteristic is determined as the quantity. As another example, a greater response for orientation metrics is identified. The level of orientation or correlation characteristic across orientations channels as a function of space is determined as the quantity. In another example, a greater response of one or more of the metrics at the first viewing direction than the second viewing direction is identified. The difference between metrics at the different viewing angles or other correlation characteristic is determined as the quantity.

In other embodiments or after correlation to identify a type or existence of the artifact, a histogram is used to determine the quantity. The quantified visibility is a function of a histogram of one or more perception-based visual quality metrics. The channel values for individual pixels or scalars from pixel regions (e.g., sub-regions of the volume rendered image) populate the histogram. Separate histograms may be generated for different channels. Data from multiple channels may be combined and used to populate a histogram. One channel may be used after identification using a plurality of channels. The median or other histogram characteristic may be used as the quantity. For example, the 90-95% value of the histogram is used. In other embodiments, a histogram is not provided, such as averaging the channel data after applying a smoothing filter or without applying a smoothing filter. Any scalar calculation may be used. In other alternative embodiments, the channel data is displayed as an image. The modulation of intensity or color for each pixel represents the quantity.

In act 26, one or more rendering artifacts are identified. The identification may be general, such as providing the quantification to represent a level of artifact. The identification may be specific, such as identifying one or more regions of the rendered image associated with a pattern, correlation, or sufficient quantity (e.g., level of artifact). The identification is as a function of the quantity.

Any or multiple types of artifacts may be identified together or separately. For example, shading noise, edge non-smoothness, and opacity inconsistencies are identified as separate artifacts from the rendered image. The correlation or pattern of metrics and/or data from different channels identifies these different types of artifacts.

The quantity may be displayed or output for any use. For example, volume rendering is performed again using different settings where the artifact is sufficiently visible based on the quantity. The quantity from one rendered image may be compared with a quantity from another rendered image to determine a more desirable calibration, algorithm, or settings.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A system for artifact quantification in volume rendering, the system comprising:
a memory operable to store a dataset representing a three-dimensional volume;
a processor configured to volume render a two-dimensional representation of the three-dimensional volume from the dataset, configured to determine a quantity representing a rendering artifact from the volume rendering of the three-dimensional volume and in the single two-dimensional representation, the determining of the quantity being as a function of a perception-based visual quality metric, the quantity determined to represent one or more of gradient-based shading noise having a first pattern, edge non-smoothness having a second pattern, or opacity inconsistency due to size variation in anisotropic data having a third pattern, as the rendering artifact in the two-dimensional representation, and configured to identify the one or more of the rendering artifact as the gradient-based shading noise by the first pattern, as the edge non-smoothness by the second pattern, or as the opacity inconsistency by the third pattern; and
a display operable to display the two-dimensional representation of the volume, the quantity, or both;
wherein the determining of the quantity comprises correlating responses from a plurality of perception-based visual quality metrics to the types of rendering artifacts;
wherein volume rendering comprises volume rendering a spherical phantom at a first viewing direction, further comprising volume rendering the spherical phantom at a second, different viewing direction;
wherein correlating comprises identifying a greater response of one or more of the metrics at the first viewing direction than the second viewing direction; and
wherein identifying the one or more of the rendering artifact comprises identifying opacity inconsistency by the third pattern, as a function of the correlation, as the rendering artifact.

2. The system of claim 1 wherein the perception-based visual quality metric is a function of vertical features, horizontal features, angle features, contrast sensitivity, luminance sensitivity, psychophysical masking, or combinations thereof.

3. The system of claim 1 wherein the processor is operable to alter at least one rendering parameter as a function of the quantity, the at least one rendering parameter comprising sample size, sampling rate, classification, sampling variation, volume size, rendering method, or combinations thereof.

4. The system of claim 1 wherein the artifact comprises shading noise having the first pattern, and wherein the perception-based visual quality metric comprises higher spatial frequency response of the two-dimensional representation, the processor configured to identify an amount of the shading noise by the first pattern using the higher spatial frequency response.

5. The system of claim 1 wherein the artifact comprises edge non-smoothness having the second pattern, and wherein the perception-based visual quality metric comprises orientation responses at a respective plurality of orientations relative to the two-dimensional representation, the processor configured to identify an amount of the edge non-smoothness by the second pattern using the orientation responses.

6. The system of claim 1 wherein the artifact comprises opacity inconsistency having the third pattern and wherein the perception-based visual quality metric comprises a plurality of measures of differences between the two-dimensional representation and another two-dimensional representation of the volume rendered from a different perspective, the processor configured to identify an amount of the opacity inconsistency by the third pattern using the differences.

7. The system of claim 1 wherein the perception-based visual quality metric is a function of vertical features, horizontal features, angle features, contrast sensitivity, luminance sensitivity, psychophysical masking, or combinations thereof; and
wherein the processor is operable to identify the one or more of, within the two-dimensional representation, shading noise by the first pattern, edge non-smoothness by the second pattern, and opacity inconsistency by the third pattern.

8. The system of claim 1 wherein the processor is operable to mask the dataset as a function of at least the perception-based visual quality metric.

9. The system of claim 1 wherein the quantity is a function of a histogram of the perception-based visual quality metric from different sub-regions of the two-dimensional representation.

10. A method for artifact quantification in volume rendering, the method comprising:
    volume rendering a volume rendered image from a dataset, the volume rendered image being a two-dimensional representation of the three-dimensional volume from the dataset;
    quantifying, by a processor, a quantity representing visibility to a user of an undesirable rendering feature in the volume rendered image, the quantity representing a rendering artifact from the volume rendering of the three-dimensional volume and in the single two-dimensional representation, the determining of the quantity being as a function of a perception-based visual quality metric; and
    identifying, by the processor, a type of rendering artifact from among a plurality of different types including one or more of gradient-based shading noise having a first pattern, edge non-smoothness having a second pattern, or opacity inconsistency due to size variation in anisotropic data having a third pattern, the identifying being as a function of the quantifying;
    wherein quantifying comprises correlating responses from a plurality of perception-based visual quality metrics to the types of rendering artifacts;
    wherein volume rendering comprises volume rendering a spherical phantom at a first viewing direction, further comprising volume rendering the spherical phantom at a second, different viewing direction;
    wherein correlating comprises identifying a greater response of one or more of the metrics at the first viewing direction than the second viewing direction; and
    wherein identifying comprises identifying opacity inconsistency by the third pattern, as a function of the correlation, as the rendering artifact.

11. The method of claim 10 wherein quantifying comprises calculating a perception-based visual quality metric as a function of vertical features, horizontal features, orientation features, contrast sensitivity, luminance sensitivity, psychophysical masking, or combinations thereof.

12. The method of claim 10 wherein correlating comprises identifying a greater response for higher spatial frequency of two or more of the metrics than lower spatial frequency; and
    wherein identifying comprises identifying shading noise by the first pattern, as a function of the correlation, as the rendering artifact.

13. The method of claim 10 wherein correlating comprises identifying a greater response for orientation metrics than other of the perception-based visual quality metrics; and
    wherein identifying comprises identifying edge non-smoothness by the second pattern, as a function of the correlation, as the rendering artifact.

14. The method of claim 10 wherein quantifying comprises calculating a just noticeable difference level of visibility of the undesirable rendering feature.

15. The method of claim 10 wherein the quantified visibility is a function of a histogram of one or more perception-based visual quality metrics from different sub-regions of the volume rendered image.

16. In a non-transitory computer readable storage medium having stored therein data representing instructions executable by a programmed processor for artifact quantification in volume rendering, the storage medium comprising instructions for:
    volume rendering a two-dimensional image representation of a three-dimensional volume from a data set representing the three-dimensional volume;
    calculating a first quantity with a human visual model from the two-dimensional image representation; and
    identifying a type of a rendering artifact in the two-dimensional image representation from among a plurality of different types including one or more of gradient-based shading noise having a first pattern, edge non-smoothness having a second pattern, or opacity inconsistency due to size variation in anisotropic data having a third pattern, the identifying being as a function of the first quantity;
    wherein calculating a first quantity comprises correlating responses from a plurality of perception-based visual quality metrics to the types of rendering artifacts;
    wherein volume rendering comprises volume rendering a spherical phantom at a first viewing direction, further comprising volume rendering the spherical phantom at a second, different viewing direction;
    wherein correlating comprises identifying a greater response of one or more of the metrics at the first viewing direction than the second viewing direction; and
    wherein identifying a type of rendering artifact comprises identifying opacity inconsistency by the third pattern, as a function of the correlation, as the rendering artifact.

17. The non-transitory computer readable storage medium of claim 16 wherein calculating comprises calculating as a function of two or more perception-based visual quality metrics each corresponding to one of vertical features, horizontal features, angle features, contrast sensitivity, luminance sensitivity, psychophysical masking, or combinations thereof; and
    wherein identifying comprises identifying the one or more of, within the two-dimensional image representation, shading noise by the first pattern, edge non-smoothness by the second pattern, and opacity inconsistency by the third pattern.

* * * * *